US012644397B2

(12) United States Patent
Tomankiewicz et al.

(10) Patent No.: US 12,644,397 B2
(45) Date of Patent: Jun. 2, 2026

(54) COOLING SYSTEM FOR COOLING AN EXHAUST-GAS TURBOCHARGER

(71) Applicant: BorgWarner Inc., Auburn Hills, MI (US)

(72) Inventors: Joanna Tomankiewicz, Rzeszow (PL); Michal Zatek, Zbyslavice (CZ); Grzegorz Kondora, Rzeszow (PL); Slawomir Pietrowicz, Wroclaw (PL)

(73) Assignee: BorgWarner, Inc., Auburn Hills, MI (US)

( * ) Notice: Subject to any disclaimer, the term of this patent is extended or adjusted under 35 U.S.C. 154(b) by 0 days.

(21) Appl. No.: 19/211,203

(22) Filed: May 18, 2025

(65) Prior Publication Data

US 2026/0009349 A1 Jan. 8, 2026

(51) Int. Cl.

| | |
|---|---|
| ***F01K 23/10*** | (2006.01) |
| ***F01K 23/06*** | (2006.01) |
| ***F02B 37/00*** | (2006.01) |
| ***F02G 5/02*** | (2006.01) |
| *F02B 39/00* | (2006.01) |

(52) U.S. Cl.

CPC ............ *F01K 23/10* (2013.01); *F01K 23/065* (2013.01); *F02B 37/00* (2013.01); *F02G 5/02* (2013.01); *F02B 39/005* (2013.01)

(58) Field of Classification Search

CPC ........... F02B 37/00; F02B 39/005; F02F 5/02; F01K 23/065

USPC ................................ 60/605.1, 599, 616–618

See application file for complete search history.

(56) References Cited

U.S. PATENT DOCUMENTS

| | | | |
|---|---|---|---|
| 10,711,683 | B2 | 7/2020 | Arnold et al. |
| 2015/0086394 | A1 | 3/2015 | Taguchi et al. |
| 2017/0260889 | A1 | 9/2017 | Zhou et al. |
| 2020/0392883 | A1 | 12/2020 | Semke et al. |

FOREIGN PATENT DOCUMENTS

| | | | | |
|---|---|---|---|---|
| DE | 102021126261 B3 | 6/1996 | | |
| DE | 202010005708 U1 * | 8/2010 | ................ | F02C 6/12 |
| DE | 112011102951 T5 * | 7/2013 | ........... | F01K 23/065 |
| DE | 102016205267 A1 * | 10/2016 | ................ | F02C 6/18 |
| EP | 2500530 A1 | 9/2012 | | |

* cited by examiner

*Primary Examiner* — Ngoc T Nguyen

(74) *Attorney, Agent, or Firm* — Patent Central LLC; Stephan A. Pendorf; Naomi Voegtli

(57) ABSTRACT

The invention relates to a cooling system (30) for cooling an exhaust-gas turbocharger (5) as a heat source (50), the cooling system (30) including a cooling pipe (45) filled with a working fluid (60; 65), wherein the cooling pipe is arranged at a distance from a turbine housing (10) of the exhaust-gas turbocharger (5), wherein the cooling pipe (45) is formed as a loop so that the working fluid is self-propelling within the cooling pipe (45), wherein the heat source (50) is serving as a evaporator for the working fluid and a heat sink (35) is serving as a condenser for the working fluid, wherein the working fluid (60; 65) is selected according to the amount of heat produced by the heat source (50).

13 Claims, 2 Drawing Sheets

COOLING SYSTEM FOR COOLING AN EXHAUST-GAS TURBOCHARGER

Figure 1:
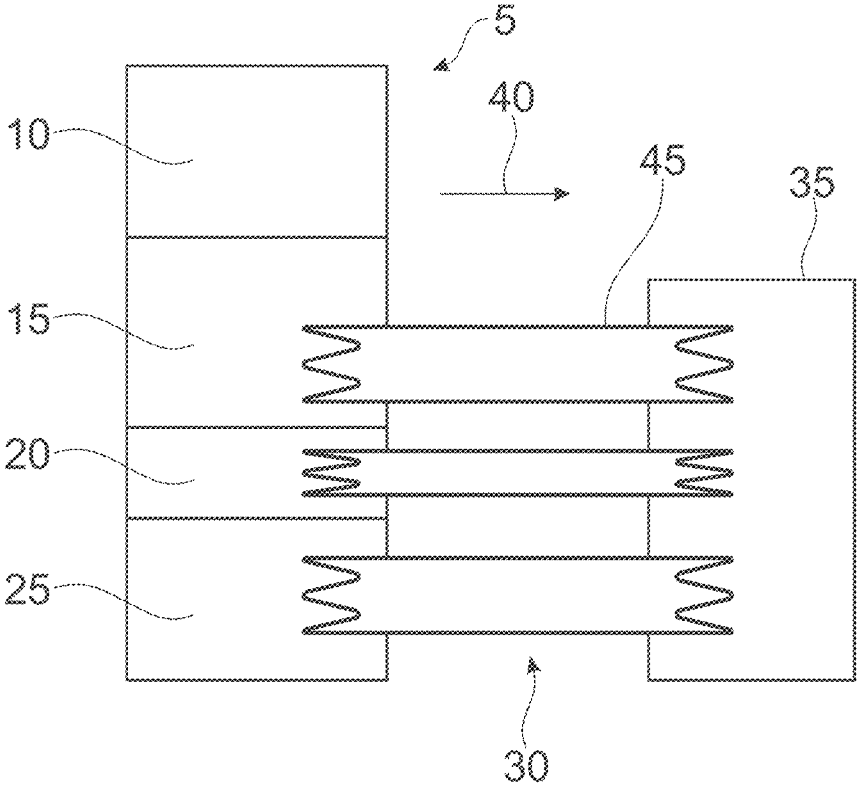

This invention relates to a cooling system for cooling an exhaust-gas turbocharger.

Several automotive components act as a heat source during their normal operation. As an example, reference can be made to exhaust-gas turbochargers used in internal combustion engines.

Turbocharging devices, which are intended for use as exhaust-gas turbochargers in connection with internal combustion engines, are generally known. Such devices are typically designed to supply air to an engine intake. For this purpose, a turbine housing is provided, which is arranged at an exhaust manifold of the internal combustion engine. A compressor housing is arranged in an intake manifold of the internal combustion engine. A bearing housing is connected to the turbine housing and the compressor housing. Between the bearing housing and the compressor housing a backplate can be arranged. In the bearing housing, a shaft is rotatably mounted, which connects a turbine wheel inside the turbine housing with a compressor wheel inside the compressor housing.

Turbocharging devices are heated by the hot exhaust gases of the internal combustion engine. In addition, air temperature is increased on the air intake side during compression of the air in the compressor. In order to cool turbocharging devices, water channels are located within housing of the compressor, the bearing and/or the turbine. The water channels within the housing are usually referred to as a water core.

DE 10 2021 126 261 B3 shows a method for operating a drive device, which has a drive unit which is fluidically connected to a compressor, which has a compressor impeller rotatably mounted in a compressor housing, at least one coolant channel being present in the compressor housing, to which coolant channel a liquid coolant is supplied at least intermittently for temperature control of the compressor housing, wherein the coolant is supplied in such a way and the coolant is selected in such a way that the coolant evaporates during intended operation of the drive device to realize phase change cooling of the compressor housing, wherein the at least one coolant channel is connected in terms of flow to a coolant circuit of the drive direction and the coolant is circulated at least temporarily in the coolant circuit, wherein the coolant is supplied to at least one device to be tempered and this is done in such a way that the coolant passes completely through the device to be tempered without phase change.

US 2015/0086394 A1 shows a turbo-compressor, which includes an impeller, a motor that generates heat by rotation of the motor and rotatably drives the impeller, a fluid passage through which a working fluid is passed via the impeller, and a heating mechanism that transfers the heat generated with the rotation of the motor to the fluid passage upstream of the impeller, to heat the working fluid inlet into the fluid passage with rotation of the impeller. The working fluid is compressed in the fluid passage downstream of the impeller.

EP 2 500 530 A1 shows an engine waste heat recovery power-generating turbo system, which recovers, in the form of electricity, energy discarded from an engine. Specifically, provided is an engine waste heat recovery power-generating turbo system, which generates electricity by using waste heat available in a reciprocating engine.

U.S. Pat. No. 10,711,683 B2 refers to a method for cooling an engine that includes increasing the pressure of a liquid coolant from a first pressure to a second pressure. Components of the engine to be cooled are contacted with the liquid coolant so that the liquid coolant at least partially evaporates and forms a vapor with a particular state. Thereafter, the vapor is fed to a throttle to reduce the pressure of the liquid coolant to a third pressure. The particular state of the vapor is determined based on the temperature and the third pressure of the liquid coolant downstream of the throttle and based on the second pressure of the liquid coolant under an assumption that the throttle is an adiabatic throttle such that enthalpy of the liquid coolant remains constant as the liquid coolant passes the throttle. A desired vapor state adjustment is made based on the determined particular state of the vapor.

US 2020/0392883 A1 shows an internal combustion engine having at least one combustion chamber, the internal combustion engine being connected via the exhaust thereof with an exhaust system. Disposed in the exhaust system is a heat exchanger of an exhaust heat recovery system, which can be used to transfer the waste heat of the exhaust gas to an operating fluid of the exhaust heat recovery system. Furthermore, the internal combustion engine is couplable to an air-conditioning compressor of an air-conditioning circuit. The exhaust heat recovery system has a further heat exchanger, in which the waste heat of a compressed refrigerant of the air-conditioning circuit is transferred to the operating fluid of the exhaust heat recovery system.

US 2017/0260889 A1 shows a system for recovering waste heat energy for a motor assisted turbocharger, including a turbine, a first power transmission device connected on a first side to the turbine, a drive gear disposed about and connected on a first side to a second side of the first power transmission device, a second power transmission device connected on a first side to a second side of the drive gear, and a compressor connected to a second side of the second power transmission device. The system further includes a motor gear drivingly connected to the drive gear, a motor generator connected to the motor gear, a waste heat recovery circuit including an expander, an output gear connected to the expander and drivingly connected to the motor gear.

It is an object of the invention to provide an alternative approach for cooling an exhaust-gas turbocharger.

This object is achieved by the independent claim of the invention that relates to a cooling system for cooling an exhaust-gas turbocharger as a heat source and further by an exhaust-gas turbocharger with such a cooling system. Further advantageous embodiments of the invention are the subject of dependent claims. These can be combined in a technologically meaningful way. The description, in particular in connection with the drawing, characterizes and specifies the invention additionally.

According to the invention, cooling system for cooling an exhaust-gas turbocharger as a heat source is described, the cooling system comprising a cooling pipe filled with a working fluid, wherein the cooling pipe is arranged at a distance from a turbine housing of the exhaust-gas turbocharger, wherein the cooling pipe is formed as a loop so that the working fluid is self-propelling within the cooling pipe, wherein the heat source is serving as a evaporator for the working fluid and a heat sink is serving as a condenser for the working fluid, wherein the working fluid is selected according to the amount of heat produced by the heat source.

Instead of using water cores for cooling, as often used in the prior art, the inventive cooling system provides a two-phase, passive heat transfer solution that is working on evaporation at the heat source and condensation at the heat sink of the working fluid inside the cooling pipe which acts as a capillary pipe. A further advantage of the inventive cooling system is the high heat flux values due to circulation of the two-phase mixture (liquid and vapour) and use of highly efficient thermal flow mechanisms for boiling and condensation processes combined with mass exchange. Furthermore, the inventive cooling system provides high heat flux values even for low temperature difference between evaporator and heat sink.

The inventive cooling system offers a simple and low-cost construction, as only the cooling pipe and the working fluid as a coolant is needed. The cooling pipe acts as a capillary tube and can be made from different materials or can be formed as a cavity within the heat source and/or the heat sink.

According to an embodiment of the invention, the working fluid is an alcohol water mixture.

Experiments have shown that an alcohol water mixture is well suited as a coolant. It is, however, conceivable that other mixtures can be used as well. For example, agents that are used in refrigeration, such as HFE 7000 (Heptafluoropropyl methyl ether) or HFE 7100 (methoxy-nonafluorobutane) could be used as well.

According to a further embodiment of the invention, the alcohol is ethanol.

Ethanol is readily available and can be used as a cost-effective coolant.

According to a further embodiment of the invention, the water to ethanol ratio is preferably 50%.

Although the water to ethanol ratio can be adapted for the specific application, the claimed value is typical for most purposes.

According to a further embodiment of the invention, the filling ratio is defined as the volume of cooling pipe to volume of working fluid, According to this definition, the filing ratio is easily reproducible so that precise values of the filing ratio can be achieved during filing with the working fluid.

According to a further embodiment of the invention, the filling ration is between 50 to 80%, preferably around 70%.

Similar as stated above, the filling ration can be adapted for the specific application, the claimed value is however typical for most purposes.

According to a further embodiment of the invention, the diameter of the cooling pipe allows for capillary effects of the working fluids within the cooling pipe.

The internal diameter of the cooling pipe is adapted to the working fluid so that the desired capillary effect of the working fluid occurs. Within the inventive cooling system, the heat sink can be located below the evaporator due to the capillary effect within the cooling pipe.

According to a further embodiment of the invention, the working fluid is passively pulsating between the heat source and the heat sink or circulating from the heat source to the heat sink and back.

The inventive cooling system offers passive functioning without any need for an external pump to force a flow.

According to a further embodiment of the invention, the working fluid undergoes a phase change between the heat source and the heat sink.

According to a further embodiment of the invention, the working fluid is guided in the cooling pipe in a quasi-adiabatic section between the heat source and the heat sink.

According to a further embodiment of the invention, the automotive component is an exhaust-gas turbocharger.

According to a further embodiment of the invention, the cooling pipe is arranged in a compressor housing, in a backplate, in a bearing housing, or in a turbine housing so as to reduce temperature of the exhaust-gas turbocharger to prevent coking.

Furthermore, an exhaust-gas turbocharger having a cooling system as described above is disclosed.

Usage of the inventive cooling system and its embodiments for turbocharger component cooling achieves different proposes, in particular a reduction of soot in the compressor diffuser, a reduction of the so called T2 temperature (at the compressor housing outlet) due to more efficient cooling compared to a water core, and in general a reduction of component temperatures, e.g. of the bearing housing. Oil coking is caused by high compressor outlet temperature and particles of oil.

According to the invention, the automotive component could also be an electrical motor, preferably a radial or an axial flux motor used for a fan for batterie cooling during re-charging. In addition, an electrical motor could be provided with a cooling system as described above.

Figure 2:
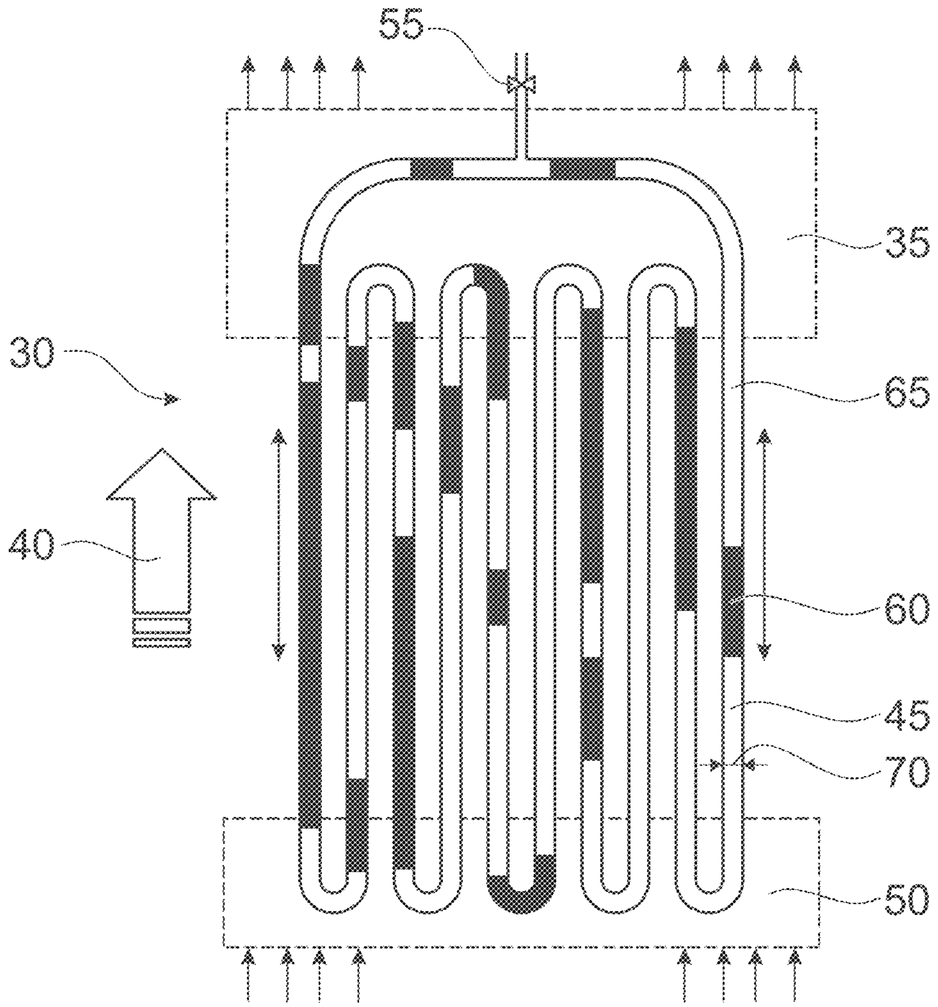

In the following, some examples of the invention are explained in more detail with respect to the drawings the drawing, wherein:

FIG. 1 shows an embodiment of an exhaust-gas turbocharger with an inventive cooling system in a schematically simplified view, and FIG. 2 shows a cross-sectional view of an embodiment of a cooling system.

In the figures, identical or functionally identical components are provided with the same reference symbols.

FIG. 1 shows an embodiment of an exhaust-gas turbocharger 5 in a schematically simplified view. The exhaust-gas turbocharger 5 serves as an exemplary application of an inventive cooling system. Further examples of the inventive cooling system are given below.

The exhaust-gas turbocharger 5 is intended for use in connection with internal combustion engines, to supply air to an engine intake. The exhaust-gas turbocharger 5 comprises a turbine housing 10, which is arranged at an exhaust manifold of the internal combustion engine. A compressor housing 25 is arranged in an intake manifold of the internal combustion engine. A bearing housing 15 is connected to the turbine housing 10 and the compressor housing 25. Between the bearing housing 15 and the compressor housing 25 a backplate 20 can be arranged. In the bearing housing 15, a shaft (not shown in FIG. 1) is rotatably mounted, which connects a turbine wheel (not shown in FIG. 1) inside the turbine housing 10 with a compressor wheel (not shown in FIG. 1) inside the compressor housing 25.

According to the invention, a cooling system 30 is provided so that heat from the exhaust-gas turbocharger 5 as the heat source is transferred to a heat sink 35 being located at a certain distance from the exhaust-gas turbocharger 5. The direction of the heat transfer from the heat source to the heat sink is indicated by reference numeral 40. Between the heat source and the heat sink one or more cooling pipes 45 are arranged as a closed loop, i.e., in a circumferential manner. Accordingly, the cooling pipes 45 are capable of guiding a working fluid between the heat source and the heat sink.

As depicted in FIG. 1, the bearing housing 15, the backplate 20, and the compressor housing 25 are connected to the cooling system 30 via cooling pipes 45. However, different applications can foresee other configurations. For example, the inventive cooling system and its embodiments can be used for turbocharger component cooling so that a reduction of soot in the compressor diffuser can be achieved. Accordingly, a reduction of the so called T2 temperature at the outlet of the compressor housing 25 due to more efficient cooling compared to a water core can be accomplished.

The cooling pipe 45 is arranged at a distance from the turbine housing 10 of the exhaust-gas turbocharger 5. The cooling pipe 45 is arranged in at least one of the following components, namely the compressor housing 25, the back-plate 20, or the bearing housing 15, which are located, as mentioned above, at a distance from the turbine housing 10. In other embodiments, the cooling pipe 45 can further be arranged in the turbine housing 10. In order to reduce the temperature of the exhaust-gas turbocharger 5, the cooling pipe 45 is formed as a loop so that the working fluid is self-propelling within the cooling pipe 45. In other words, no pump or other active component are used for moving the working fluid. The cooling pipe 45 can be formed as a single loop (ring-shaped) or as a helix with one or more turns.

In general, a reduction of component temperatures, e.g. of the bearing housing, can be achieved. Oil coking is caused by high compressor outlet temperature and the presence of particles of oil. A reduction of the compressor outlet temperature reduces the effect of oil coking. The cooling system 30 leads to a reduced intake manifold temperature, which has a positive effect on engine performance. Typically, the cooling pipes can be arranged at the backplate 20 or at the bearing housing 15 close to the compressor housing 10, or at the compressor housing 10 in close proximity to the compressor wheel.

The invention has been described with respect to the exhaust-gas turbocharger 5 as an automotive component having the cooling system 30 as described above.

A more general description of the cooling system 30 is depicted with reference to FIG. 2.

The cooling system 30 is arranged between a heat source 50 and the heat sink 35. The cooling system 30 includes the cooling pipe 45 filled with the working fluid. The heat source 50 serves as an evaporator for the working fluid and the heat sink 35 serves as a condenser for the working fluid. The heat sink 35 can work against ambient air or against a cooling block.

Typically, the working fluid is an alcohol water mixture. More specifically, the alcohol is ethanol and the water to ethanol ratio is preferably around 50%.

The filling ratio is defined as the volume of cooling pipe 45 to volume of working fluid, and is typically between 50 to 80%, preferably around 70%.

Before operation, the cooling system 30 is evaporated via a valve 55. Then the desired amount of the working fluid is filled in via the valve 55 so that the envisaged filing ratio is achieved.

During operation, the working fluid undergoes a phase change between the heat source 50 and the heat sink 35. As depicted in FIG. 2, the working fluid is either in a liquid phase 60 or in a gaseous phase 65.

The diameter 70 of the cooling pipe 45 allows for capillary effects of the working fluids within the cooling pipe 45. Consequently, the working fluid is passively pulsating between the heat source 50 and the heat sink 35 or circulating from the heat source 50 to the heat sink 35 and back.

The above features and the features indicated in the claims as well as those which can be taken from the illustrations can be realized advantageously both individually and in various combinations. The invention is not limited to the exemplary embodiments described, but can be modified in many ways within the framework of the knowledge of a person skilled in the art.

LIST OF REFERENCES

5 exhaust-gas turbocharger
10 turbine housing
15 bearing housing
20 backplate
25 compressor housing
30 cooling system
35 heat sink
40 heat transfer
45 cooling pipe
50 heat source
55 valve
60 working fluid, liquid phase
65 working fluid, gaseous phase
70 diameter

The invention claimed is:

1. A cooling system (30) for cooling an exhaust-gas turbocharger (5) as a heat source (50), the cooling system (30) comprising a cooling pipe (45) filled with a working fluid (60, 65), wherein the cooling pipe is arranged at a distance from a turbine housing (10) of the exhaust-gas turbocharger (5), wherein the cooling pipe (45) is formed as a loop so that the working fluid (60, 65) is moved within the cooling pipe (45) without using a pump or active component in the cooling pipe, wherein the heat source (50) is serving as an evaporator for the working fluid (60, 65) and a heat sink (35) is serving as a condenser for the working fluid, wherein the working fluid (60, 65) is selected according to the amount of heat produced by the heat source (50).

2. The cooling system (30) according to claim 1, wherein the working fluid (60; 65) is an alcohol water mixture.

3. The cooling system (30) according to claim 2, wherein the alcohol is ethanol.

4. The cooling system (30) according to claim 3, wherein the water to ethanol ratio is approximately 50%.

5. The cooling system (30) according to claim 1, wherein a filling ratio is defined as the volume of cooling pipe (45) to volume of working fluid.

6. The cooling system (30) according to claim 5, wherein the filling ratio of the working fluid is from 50 to 80%.

7. The cooling system (30) according to claim 6, wherein the filling ratio is around 70%.

8. The cooling system (30) according to claim 1, wherein the diameter (70) of the cooling pipe (45) is adapted to the working fluid.

9. The cooling system (30) according claim 1, wherein the working fluid (60, 65) is moved within the cooling pipe (45) such that it is passively pulsating between the heat source (50) and the heat sink (35) or passively circulating within the cooling pipe (45).

10. The cooling system (30) according to claim 1, wherein the working fluid undergoes a phase change between the heat source (50) and the heat sink (35).

11. The cooling system (30) according to claim 1, wherein the cooling pipe is arranged in at least one of group being comprised of a compressor housing (25), a backplate (20), and a bearing housing (15) so as to reduce temperature of the exhaust-gas turbocharger (5).

12. The cooling system system (30) according to claim 1, wherein the cooling pipe is further arranged in the turbine housing (10).

13. An exhaust-gas turbocharger having a cooling system (30) according to claim 1.

* * * * *